(12) United States Patent
Yeung

(10) Patent No.: US 8,607,375 B2
(45) Date of Patent: Dec. 17, 2013

(54) FOLDABLE BATH TUB

(75) Inventor: Kwok Lam Yeung, Hong Kong (CN)

(73) Assignee: Karibu Baby Ltd., Hong Kong (CN)

( * ) Notice: Subject to any disclaimer, the term of this patent is extended or adjusted under 35 U.S.C. 154(b) by 0 days.

(21) Appl. No.: 13/519,844

(22) PCT Filed: Mar. 11, 2011

(86) PCT No.: PCT/CN2011/071714
§ 371 (c)(1),
(2), (4) Date: Jun. 28, 2012

(87) PCT Pub. No.: WO2012/051827
PCT Pub. Date: Apr. 26, 2012

(65) Prior Publication Data
US 2013/0198947 A1    Aug. 8, 2013

(30) Foreign Application Priority Data
Oct. 22, 2010  (WO) ................ PCT/CN2010/078026

(51) Int. Cl.
*A47K 3/06* (2006.01)
*A47K 3/00* (2006.01)

(52) U.S. Cl.
CPC ....................................... *A47K 3/00* (2013.01)
USPC ............................................................. 4/585

(58) Field of Classification Search
CPC ........................................................ A47K 3/00
USPC ....................................................... 4/538–595
See application file for complete search history.

(56) References Cited

U.S. PATENT DOCUMENTS 3,803,642 A   4/1974 Erling et al.

FOREIGN PATENT DOCUMENTS

| CN | 2077680 U | 5/1991 |
|---|---|---|
| CN | 2482407 Y | 3/2002 |
| CN | 2734102 Y | 10/2005 |
| CN | 200945125 Y | 9/2007 |
| WO | 9717878 A1 | 5/1997 |

*Primary Examiner* — Lori Baker
(74) *Attorney, Agent, or Firm* — Morris Manning & Martin LLP; Tim Tingkang Xia, Esq.

(57) ABSTRACT

A foldable bath tub includes a bottom board (100), a panel (200) and a foldable circular basin wall (300) connected between the bottom board (100) and the panel (200). The bottom board (100) and the panel (200) are both formed by one-shot injection molding and the circular basin wall (300) is formed by two-shot injection molding.

20 Claims, 9 Drawing Sheets

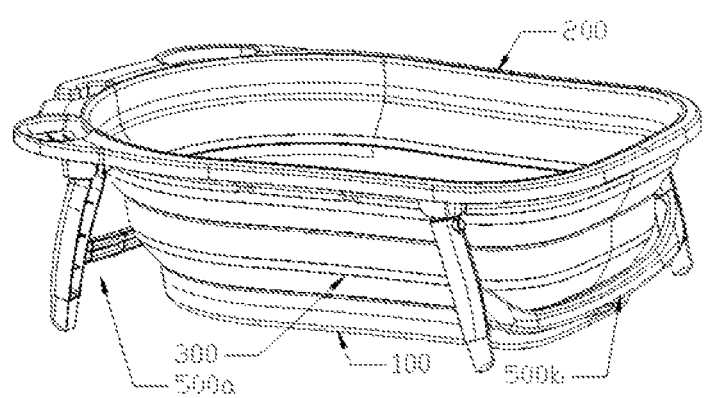
Fig. 13
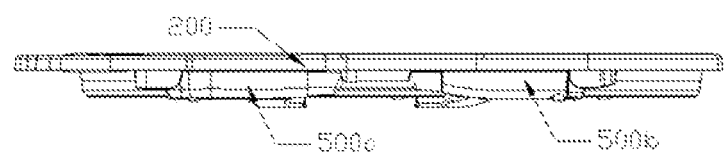
Fig. 14
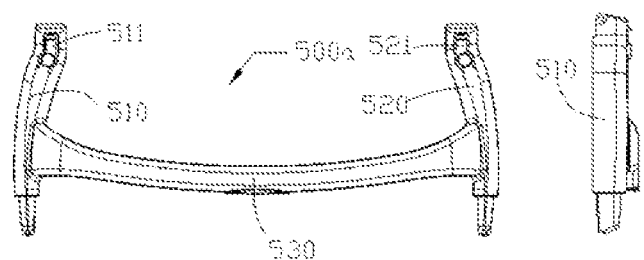 
Fig. 15a        Fig. 15b

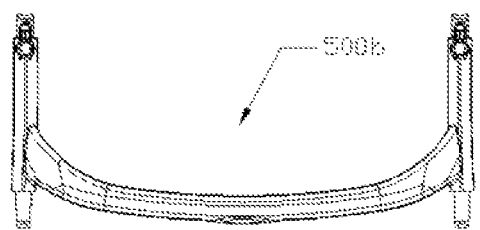
Fig. 16a    Fig. 16b
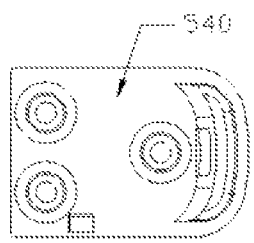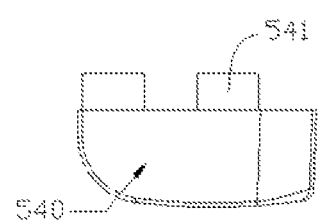
Fig. 17a    Fig. 17b
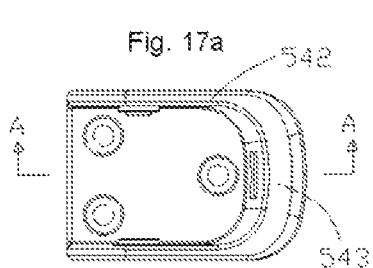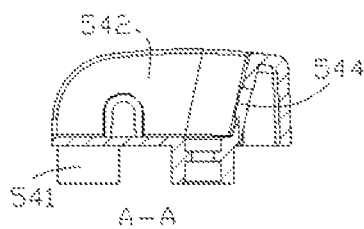
Fig. 17c    Fig. 17d

B — B

FOLDABLE BATH TUB

FIELD OF THE INVENTION

The present invention relates to bath tubs, more particularly, to a foldable bath tub.

BACKGROUND OF THE UTILITY MODEL

For most families, especially for those with children in the family, a bath tub is required for the reason that conventional baths in rest rooms are always too large for a child. In addition, because a bath tub normally has very large volume, it will take up large space for placement. When the bath tub is not in use, it's hard for users to find space for placing the bath tub. For this reason, there are some kinds of foldable bath tubs in the market at present. For example, these foldable bath tubs generally comprise a foldable supporting frame and a main body made of flexible material. In these cases, the main body is supported by the foldable supporting frame. Such bath tubs have a large number of elements, thus being inconvenient for operating when folded and unfolded. Furthermore, a fold line based on which the folding or unfolding is performed can be easily worn, causing water leakage in these worn places.

SUMMARY OF THE UTILITY MODEL

The objective of the present invention is to provide a foldable bath tub with less elements and easy operation, aiming at the above mentioned drawbacks including that the foldable bath tub in the prior art has too many elements and inconvenient operation.

According to an aspect of the present invention, a foldable bath tub is provided which includes a bottom board, a panel and a foldable circular basin wall connected between the bottom board and the panel; the bottom board and the panel are both formed by one-shot injection molding and the circular basin wall is formed by two-shot injection molding through thermoplastic elastomer.

In the foldable bath tub of the present invention, the circular basin wall comprises plurality of annular creases parallel with the bottom board, along which the circular basin wall can be folded toward the bottom board.

In the foldable bath tub of the present invention, the bottom board comprises a plane part and a lower connection wall which extends upward from edges of the plane part and connects with the circular basin wall.

In the foldable bath tub of the present invention, the lower connection wall comprises a bottom groove at the upper end thereof, wherein the bottom groove extends in the lower connection wall circumferentially for a whole periphery and is filled with thermoplastic elastomer when preparing the circular basin wall during the two-shot injection molding process.

In the foldable bath tub of the present invention, the bottom groove comprises several through holes which are filled with thermoplastic elastomer when preparing the circular basin wall during the two-shot injection molding process.

In the foldable bath tub of the present invention, the bottom board is arranged with a water outlet, and the foldable bath tub further comprises a rubber stopper adaptive with the water outlet.

In the foldable bath tub of the present invention, the panel comprises an annular edge element and an upper connection wall which extends downward from the edge element and connects with the circular basin wall.

In the foldable bath tub of the present invention, the upper connection wall comprises a cover groove at the lower end thereof, wherein the cover groove extends in the upper connection wall circumferentially for a whole periphery and is filled with thermoplastic elastomer when preparing the circular basin wall during the two-shot injection molding process.

In the foldable bath tub of the present invention, the cover groove comprises several through holes which are filled with thermoplastic elastomer when preparing the circular basin wall during the two-shot injection molding process.

In the foldable bath tub of the present invention, the edge element is provided with a hooked part, and an inner side of the hooked part is covered with thermoplastic elastomer when preparing the circular basin wall during the two-shot injection molding process.

In the foldable bath tub of the present invention, two opposite sides of the edge element are provided with a handgrip; the handgrip is provided with raised reinforcing ribs and a groove in the annular part; wherein the groove is coated with the thermoplastic elastomer when preparing the circular basin wall during the two-shot injection molding process.

In the foldable bath tub of the present invention, an upper surface of the annual part comprises a concave pattern that is provided with through holes; the thermoplastic elastomer passes through the through holes and then fills in such concave pattern when preparing the circular basin wall during the two-shot injection molding process.

In the foldable bath tub of the present invention, the edge element comprises a storage groove for placing various items.

In the foldable bath tub of the present invention, the foldable bath tub further comprises plurality of detachable supporting bars arranged between the panel and the bottom board; the supporting bar is at the outer side of the circular basin wall; when the foldable bath tub is unfolded, the supporting bar supports both the panel and the bottom board; when the foldable bath tub is folded, the supporting bar locates below the panel.

In the foldable bath tub of the present invention, the foldable bath tub comprises four supporting bars each of which has a round first end and a round second end; a lower surface of the panel is provided with four upper fixtures which comprises an upper hollow cylinder for accommodating the first end of the supporting bar, and the upper hollow cylinder is provided with a gap for the rotation of the supporting bar; the bottom board is provided with four corresponding lower fixtures which comprises a lower hollow cylinder for accommodating the second end of the supporting shaft, and the lower hollow cylinder is provided with a blocking part at an end thereof, wherein the blocking part can be opened by external force; the first end of the supporting bar is inserted into the upper hollow cylinder, and the second end of the supporting bar is inserted into the lower hollow cylinder when the foldable bath tub is unfolded and is pulled out of the lower hollow cylinder when the foldable bath tub is folded.

In the foldable bath tub of the present invention, the rubber stopper is provided with a temperature indicator layer that changes color according to temperature.

In the foldable bath tub of the present invention, the foldable bath tub comprises two foldable supporting frames on a lower surface of the panel and the two foldable supporting frames are located opposite with each other; when the foldable bath tub is unfolded, the foldable supporting frames are unfolded to support the panel; when the foldable bath tub is folded, the foldable supporting frames are folded to lean against the lower surface of the panel.

In the foldable bath tub of the present invention, the foldable supporting frame comprises two supporting legs and a lateral part connected between the two supporting legs; the foldable supporting frame also comprises two connectors that are in rotary connection with the upper ends of the supporting legs and in permanent connection with the lower surface of the panel.

In the foldable bath tub of the present invention, the upper end of the supporting leg is provided with a flexible fastener, and the connector is provided with a fastener position adaptive with the flexible fastener; when the foldable supporting frame is unfolded, the flexible fastener buckles into the fastener position.

In the foldable bath tub of the present invention, the connector is provided with a U-shaped periphery; when the foldable supporting frame is unfolded, the supporting legs locate against a bottom of the U-shaped periphery.

When implementing the foldable bath tub of the present invention, the following advantageous effect may be achieved: the foldable bath tub can be formed by plastics and thermoplastic elastomer through a one-shot injection molding process and a two-shot injection molding process respectively; the foldable bath tub is portable, simple in structure, convenient for folding or unfolding and small in volume, thus being suitable for using in home and during travelling.

BRIEF DESCRIPTION OF THE DRAWINGS

The present invention is further described with respect to the accompanying drawings and embodiments in the following. In the figures:

FIG. 13 is a schematic view for a third embodiment of the foldable bath tub in an unfolding state in the present invention;

FIG. 14 is a schematic view for a third embodiment of the foldable bath tub in a folding state in the present invention;

FIGS. 15a and 15b are schematic views for front supporting frames in a third embodiment of the foldable bath tub in the present invention;

FIGS. 16a and 16b are schematic views for rear supporting frames in a third embodiment of the foldable bath tub in the present invention;

FIGS. 17a-d are schematic views for front connectors in a third embodiment of the foldable bath tub in the present invention;

DETAILED DESCRIPTION OF THE PREFERRED EMBODIMENT

Figure 1:
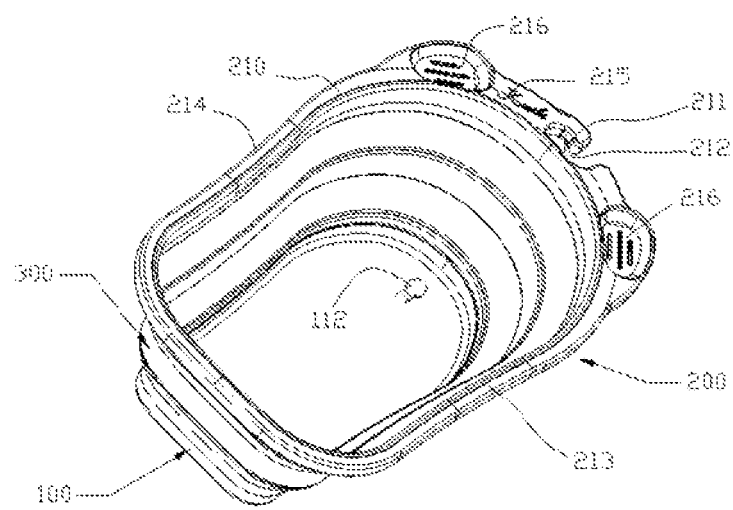
FIG. 1 is a stereogram of a preferred embodiment of the foldable bath tub in the present invention.
Figure 2:
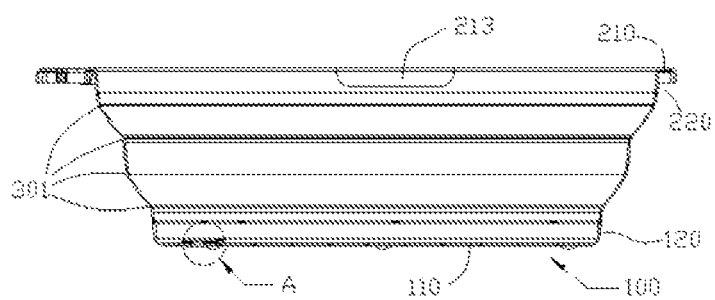
FIG. 2 is a cross sectional view of a preferred embodiment of the foldable bath tub in the present invention.
Figure 3:
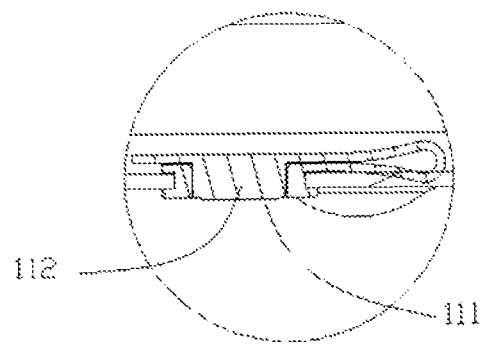
FIG. 3 is an enlarged view showing part A in FIG. 2.
Figure 4:
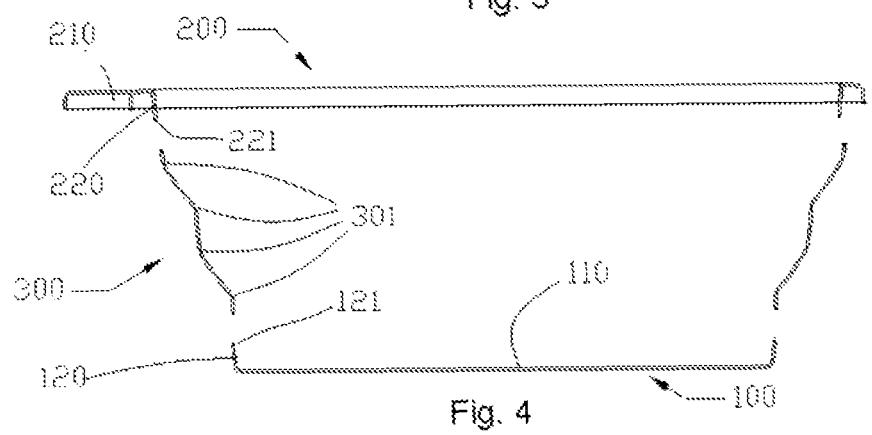
FIG. 4 an exploded view of a preferred embodiment of the foldable bath tub in the present invention.
Figure 5:
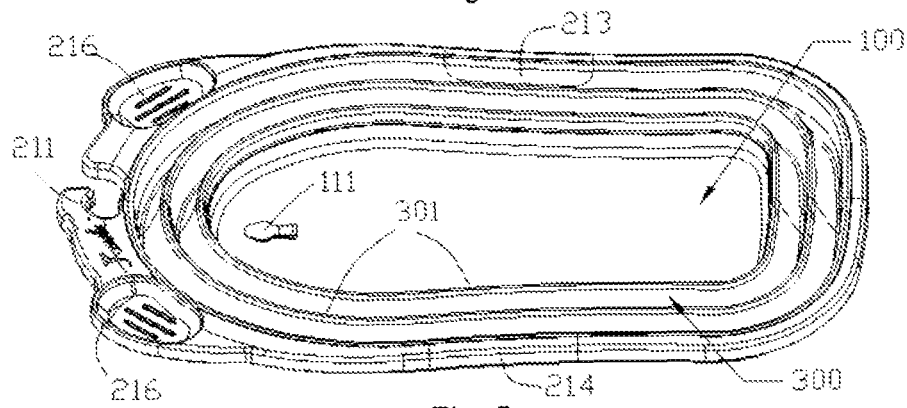
FIG. 5 is a top view of a preferred embodiment of the foldable bath tub in a folding state in the present invention.

In order to make the technical feature, objective and effect of the present invention be understood more clearly, the specific implementations of the present invention is now illustrated in detail with reference to accompanying drawings.

FIGS. 1-5 show a preferred embodiment of the foldable bath tub in the present invention. The foldable bath tub comprises a bottom board 100, a panel 200 and an circular basin wall 300 which is foldable between the bottom board 100 and the panel 200. The bottom board 100 and the panel 200 are both formed by plastics (e.g. polypropylene (PP)) through a one-shot injection molding process. After the bottom board 100 and the panel 200 are formed, they are subsequently placed into a mould, in which case a two-shot injection molding process is carried out to form the circular basin wall 300. Wherein, the circular basin wall 300 can be formed by thermoplastic elastomer (TPE). TPE is one kind of environment-friendly and non-toxic material that has the same high flexibility, strength and resilience as those of rubber, as well as broad hardness range, excellent dyeing property, soft tactility, weather resistance, fatigue resistance and thermal tolerance. Besides, TPE possesses excellent manufacturing properties including that it can be suitable for injection molding (incl. two-shot injection molding), require no vulcanization and be covered with and adhered to substrate materials such as PP, polyethylene (PE), polycarbonate (PC), polystyrene (PS) and acrylate butyl styrene (ABS). During the step of forming the circular basin wall 300 in the two-shot injection molding process by the thermoplastic elastomer, the circular basin wall 300 is integrated with the injection molded bottom board 100 and the panel 200. The circular basin wall 300 comprises plurality of annular creases 301 parallel with the bottom board 100, along which the circular basin wall 300 can be folded toward the bottom board 100.

In this embodiment, in order to facilitate the connection between the bottom board 100 and the circular basin wall 300, the bottom board 100 comprises a plane part 110 and a lower connection wall 120 which extends upward from edges of the plane part 110 and further connects with the circular basin wall 300. The lower connection wall 120 comprises a bottom groove at the upper end 121 thereof, wherein the bottom groove extends in the lower connection wall 120 circumferentially for a whole periphery. The bottom groove is filled with thermoplastic elastomer when preparing the circular basin wall 300 during the two-shot injection molding process, thus forming a secure connection between the circular basin wall 300 and the bottom board 100. Herein, the expression "bottom groove" refers to a groove formed in the upper end 121 of the lower connection wall 120. It is used for increasing the adhesive area between the thermoplastic elastomer and the lower connection wall 120 during the two-shot injection molding process in order to form a reliable connection therebetween. Further, the bottom groove is provided with several through holes which are filled with thermoplastic elastomer when preparing the circular basin wall 300 during the two-shot injection molding process so as to improve connection reliability therebetween. The plane part 110 of the bottom board 100 further comprises a water outlet 111 for releasing water conveniently, and the foldable bath tub also comprises a rubber stopper 112 adaptive with the water outlet 111. The rubber stopper 112 may be fixed onto the plane part 110 of the bottom board 100 through a flexible strip, or be provided separately with respect to the bottom board 100. For the convenience of indicating water temperature for users, the bottom board 100 or the rubber stopper 112 may be provided with a temperature indicator layer made of such materials that change color according to temperature, in which case the user can determine whether the water temperature is suitable by reading the color of the temperature indicator layer. For example, it is predetermined that such temperature indicator layer would change color when the water temperature exceeds 37° C.

In this embodiment, in order to facilitate the connection between the panel 200 and the circular basin wall 300, the panel 200 comprises an annular edge element 210 and an upper connection wall 220 which extends downward from the edge element 210 and further connects with the circular basin wall 300. The upper connection wall 220 comprises a cover groove at the lower end 221 thereof, wherein the cover groove extends in the upper connection wall 220 circumferentially for a whole periphery. The cover groove is filled with thermoplastic elastomer when preparing the circular basin wall 300 during the two-shot injection molding process, thus forming a secure connection between the circular basin wall 300 and the panel 200. Herein, the expression "cover groove" refers to a groove formed on the lower end 221 of the upper connection wall 220. It is used for increasing the adhesive area between the thermoplastic elastomer and the upper connection wall 220 during the two-shot injection molding process in order to form a reliable connection therebetween. Further, the cover groove is provided with several through holes which are filled with thermoplastic elastomer when preparing the circular basin wall 300 during the two-shot injection molding process so as to improve the connection reliability therebetween.

In this embodiment, the edge element 210 comprises a hooked part 211 so as to facilitate the storage of folded bath tub. An inner side 212 of the hooked part 211 is coated with the thermoplastic elastomer when preparing the circular basin wall 300 during the two-shot injection molding process. In this way, the friction force between the hooked part 211 and a shaft for holding the hooked part such as a rack in the rest room can be increased to achieve an anti-slide effect.

In this embodiment, two opposite sides of the edge element 210 are provided with a handgrip 213, 214 respectively. The two handgrips 213, 214 are both arranged with raised reinforcing ribs to improve the strength herein. Besides, these two handgrips 213, 214 are provided with a groove in the annular part 210 respectively to achieve better handing feeling thereof. When preparing the circular basin wall 300 during the two-shot injection molding process, the groove is coated with the thermoplastic elastomer so that a thermoplastic elastomer cover layer is formed on the handgrips 213, 214 to improve their hand feeling.

In this embodiment, an upper surface of the edge element 210 comprises a concave pattern 215 that is provided with through holes. The thermoplastic elastomer passes through the through holes and then fills in such concave pattern when preparing the circular basin wall 300 during the two-shot injection molding process. In an embodiment, the panel 200 has a different color from that of the thermoplastic elastomer, so that a colorful pattern may be formed on the edge element 210. Such pattern may be used for decoration or indication such as trademark or instructions. Further, the edge element 210 comprises a storage groove 216 for placing various items including bath products such as soap or towel for convenience.

In this embodiment, the foldable bath tub has a runway-shaped cross section. However, the cross section of the bath tub should not be limited to such shape. In fact, it can have a round shape or any suitable shapes. The circular basin wall may be colorful or transparent.

Figure 6:
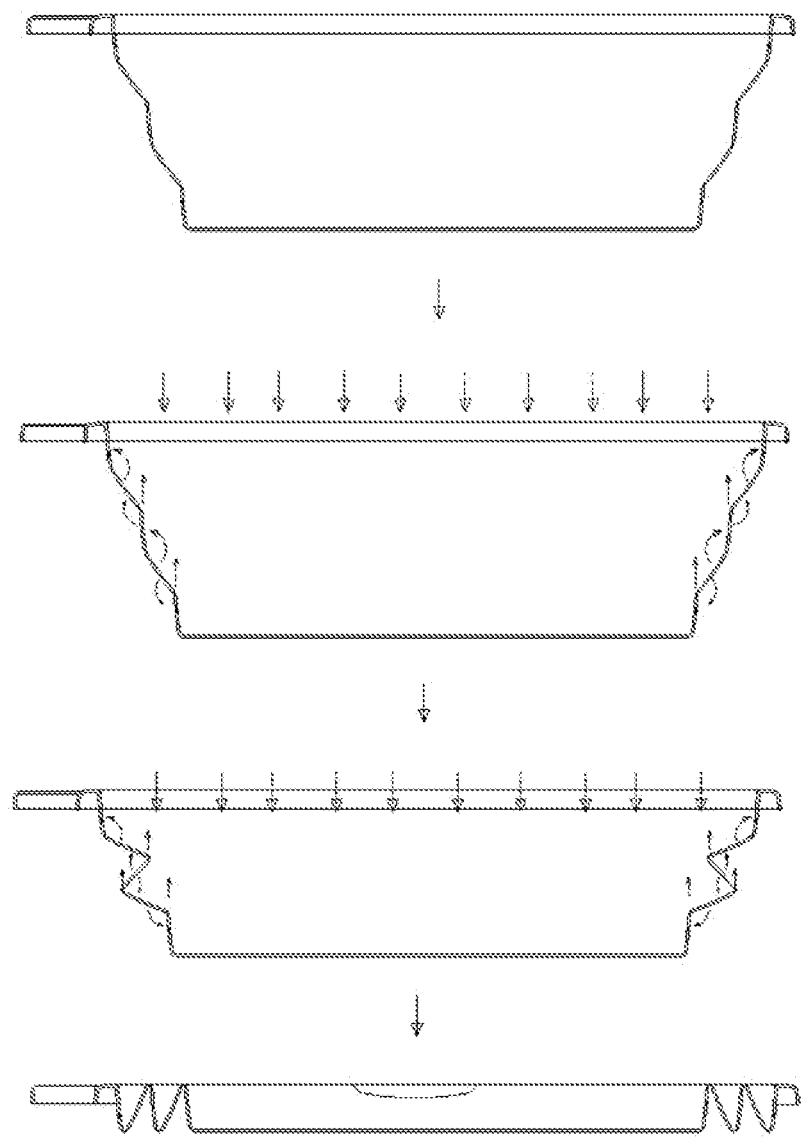
FIG. 6 illustrates the steps of folding a preferred embodiment of the foldable bath tub in the present invention.
Figure 7:
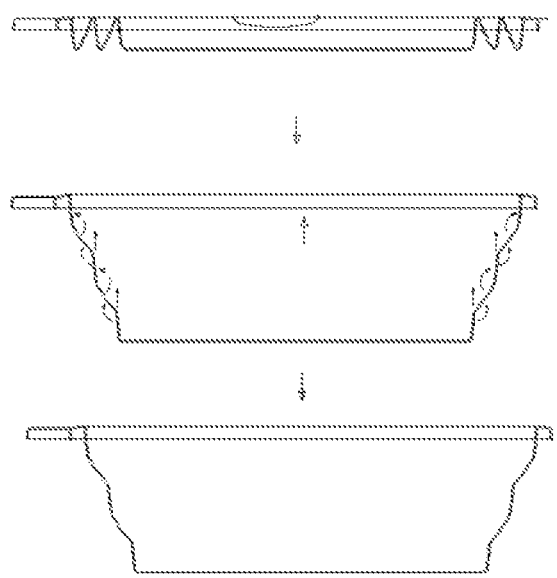
FIG. 7 illustrates the steps of unfolding a preferred embodiment of the foldable bath tub in the present invention.

Referring to FIG. 6, it shows how the foldable bath tub of the present invention is folded. At first, the unfolded foldable bath tub is placed on the ground. Then both handgrips 213, 214 on the edge element 210 are pressed downward to fold the circular basin wall 300 along the annular creases 301. Finally, the foldable bath tub can be folded to take up small space. FIG. 7 in turn shows the steps of unfolding the folded foldable bath tub. After the bottom board 100 of the bath tub is fixed, both handgrips 213, 214 on the edge element 210 are pulled upward to unfold the circular basin wall and thus the foldable bath tub along the annular creases 301. When the water outlet 111 is blocked, the foldable bath tub is ready for use.

Figure 8:
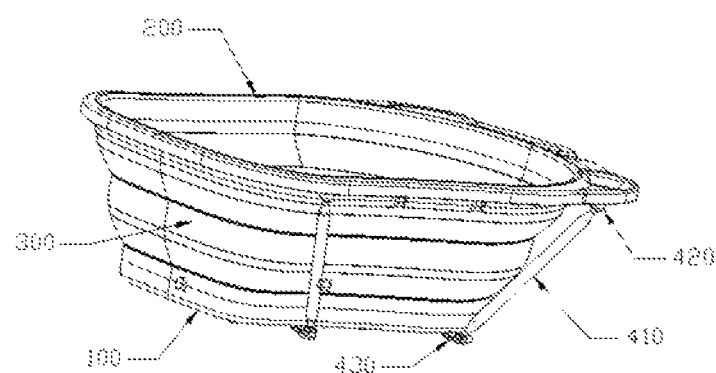
FIG. 8 is a schematic view of a second embodiment of the foldable bath tub in an unfolding state in the present invention.
Figure 9:
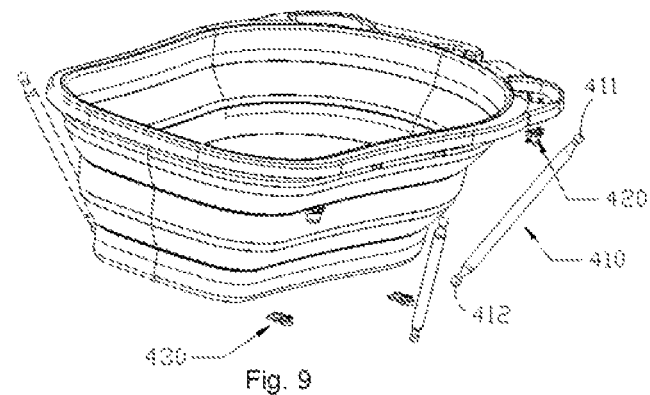
FIG. 9 is an exploded diagram for a second embodiment of the foldable bath tub in the present invention.
Figure 12:
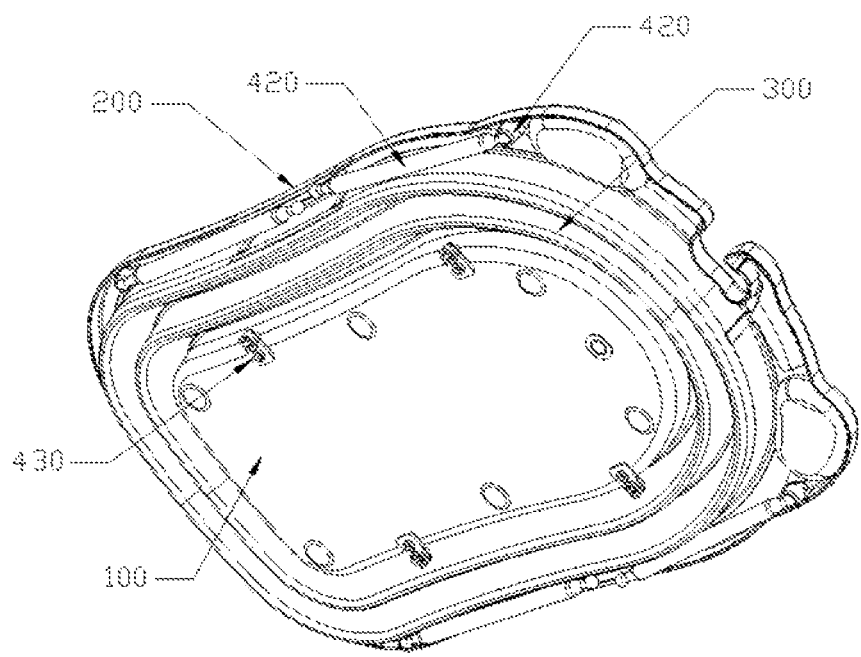
FIG. 12 is a schematic view for a second embodiment of the foldable bath tub in a folding state in the present invention.
Figure 18A:
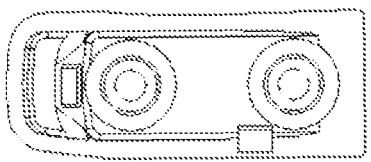
FIGS. 18a-d are schematic views for rear connectors in a third embodiment of the foldable bath tub in the present invention.
Figure 18B:
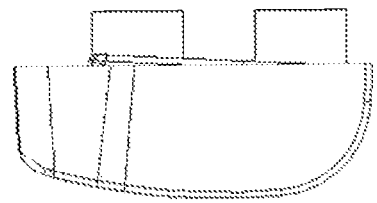
Figure 18C:
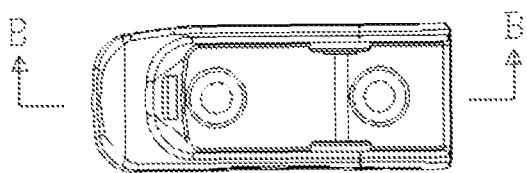
Figure 18D:
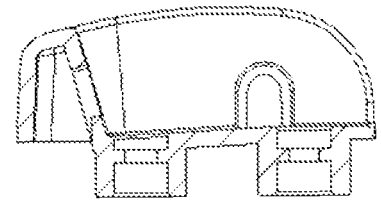

FIGS. 8, 9 and 12 illustrate a second embodiment of the foldable bath tub in the present invention. Further improvement is performed in this embodiment on the basis of the above mentioned preferred embodiment. In order to provide improved strength for the foldable bath tub in its unfolding state, plurality of detachable supporting bars 410 are arranged between the panel 200 and the bottom board 100 so that the foldable bath tub is prevented from being folded when pressed by external force during its unfolding state for usage. Specifically, the supporting bar 410 is at the outer side of the circular basin wall 300. When the foldable bath tub is unfolded, the supporting bar 410 supports both the panel 200 and the bottom board 100 for improving the strength of the foldable bath tub; when the foldable bath tub is folded, the supporting bar 410 locates below the panel 200 to reduce space consumption.

Figures 10, 11:
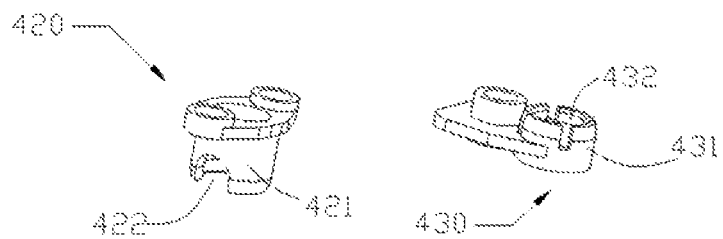
FIG. 10 is a schematic view for an upper fixture in a second embodiment of the foldable bath tub in the present invention.
FIG. 11 is a schematic view for a lower fixture in a second embodiment of the foldable bath tub in the present invention.

In the second embodiment, as shown in FIGS. 10 and 11, the foldable bath tub comprises four supporting bars 410, each of which has round ends; wherein two opposite sides of the bath tub are respectively arranged with two of such supporting bars. A lower surface of the panel 200 is provided with four upper fixtures 420 made of plastics. The upper fixture 420 comprises an upper hollow cylinder 421 for accommodating a first end 411 of the supporting bar 410, and the upper hollow cylinder 421 is further provided with a gap 422 for the rotation of the supporting bar 410. The bottom board 100 is provided with four corresponding lower fixtures 430 which are also made of plastic. The lower fixture 430 comprises a lower hollow cylinder 431 for accommodating a second end 412 of the supporting shaft 410, and the lower hollow cylinder 431 is provided with a blocking part 432 at an end thereof. The blocking part 432 can be opened by external force. In this embodiment, there are four blocking parts 432 for fixing the second end 412 of the supporting bar 410. The first end 411 of the supporting bar 410 is inserted into the upper hollow cylinder 421. The supporting bar 410 can rotate against the panel 200 due to the existence of the gap 422 and its round end. When the foldable bath tub is unfolded, the supporting bar 410 is unfolded against the panel 200, in which case its second end 412 moves away from the panel 200 and toward the bottom board 100. Because the blocking part 432 at the end of the lower hollow cylinder 431 of the lower fixture 430 can be opened, the second end 412 is easily inserted into the lower hollow cylinder 431 by external force. In that way, the strength of the foldable bath tub can be improved. When it is needed to fold the foldable bath tub, the second end 412 of the supporting bar 410 is pulled out of the lower hollow cylinder 431, and then the supporting bar 410 is rotated so as to lean against the lower surface of the panel 100 as shown in FIG. 12.

The upper fixtures 420 and lower fixtures 430 in the second embodiment are both made of plastics, and they can be secured onto the panel 200 and bottom board 100 by screws respectively. Further, a lower surface of the bottom board 100 is provided with a U-shaped slot for holding the lower fixture 430. Other structures in this embodiment are the same as those in the preferred embodiment, which are thus not repeated herein.

FIGS. 13 and 14 illustrate a third embodiment of the foldable bath tub in the present invention. Further improvement is performed in this embodiment on the basis of the above mentioned preferred embodiment. In order to provide improved strength for the foldable bath tub in its unfolding state, the foldable bath tub comprises two foldable supporting frames 500a, 500b on a lower surface of the panel 200, so that the foldable bath tub is prevented from being folded when pressed by external force during its unfolding state for usage. Specifically, the reference number 500a refers to a front supporting frame provided at a front end of the foldable bath tub, while the reference number 500b relates to a rear supporting frame provided at a rear end of the foldable bath tub. The two foldable supporting frames 500a, 500b are located opposite with each other. When the foldable bath tub is unfolded, the two foldable supporting frames 500a, 500b are unfolded to support the panel 200 to improve the strength of the foldable bath tub and prevent the foldable bath tub from being folded during use. As shown in FIG. 14, when the foldable bath tub is folded, the two foldable supporting frames 500a, 500b are folded to lean against the lower surface of the panel 200, thus reducing space consumption during storage.

In this embodiment, the two foldable supporting frames 500a, 500b have approximately similar structures. The only difference lies in that their shapes are relatively different from each other since they are located in different positions and they should be adaptive with the shape of the bath tub. As shown in FIGS. 15a and 15b, the specific structure of the foldable supporting frame is illustrated taking the supporting frame 500a as an example. The foldable supporting frame 500a comprises two supporting legs 510, 520 and a lateral part 530 connected between the two supporting legs 510, 520. Since the two supporting legs 510, 520 are connected together by the lateral part 530, the strength of the foldable supporting frame 500a can be improved to achieve a better load bearing effect. The supporting legs 510, 520 and the lateral part 530 can be injection molded as a whole, or else they can be molded separately and then connected together. Besides, the foldable supporting frame 500a also comprises two connectors 540 in rotary connection with an upper end of the supporting legs 510, 520 correspondingly and in permanent connection with the lower surface of the panel 200. Referring to FIGS. 17a-17d, they are schematic views for the foldable supporting frame 500a in which FIG. 17a is a top view, FIG. 17b is a front view, FIG. 17c is a bottom view, and FIG. 17d is a cross sectional view along line A-A. The supporting legs 510, 520 may be in rotary connection with the connector 540 by any common and suitable means. For example, a tenon is provided at ends of the supporting legs 510, 520, and a shaft hole adaptive with the tenon is correspondingly provided in the connector 540. Alternatively, a rotating shaft is used for realizing the rotary connection between the upper ends of the supporting legs 510, 520 and the connector 540. An upper end of the connector 540 is provided with a connecting column 541, as a result of which the connector can be fixed onto the panel 200 through a screw.

In this embodiment, the connector 540 further has a U-shaped periphery 542. When the foldable supporting frame 500a is unfolded, the supporting legs 510, 520 locate against a bottom 543 of the U-shaped periphery 542. An opening of the U-shaped periphery 542 makes the folded supporting legs 510, 520 lean below the panel 200. In order to keep the foldable supporting frames 500a in an unfolding state and improve the safety of the foldable bath tub, the upper ends of the supporting legs 510, 520 are provided with flexible fasteners 511, 512, and the connector 540 comprises a fastener position 544 adaptive with the flexible fasteners 511, 512. When the supporting frame 500a is unfolded, the flexible fasteners 511, 512 buckle into the fastener position 544 in order to keep the supporting frame 500a in a unfolding state. When it is needed to be folded, the flexible fasteners 511, 512 are pressed and the supporting legs 510, 520 are rotated to fold the foldable supporting frame 500a.

FIGS. 16a-16b and FIGS. 18a-18d illustrate the structure of the foldable supporting frame 500b. Its structure is approximately the same as that of the foldable supporting frame 500a, thus being not repeated herein.

In the present invention, the foldable bath tub can be formed by plastics and thermoplastic elastomer through a one-shot injection molding process and a two-shot injection molding process respectively. The foldable bath tub is portable, simple in structure, convenient for folding or unfolding and small in volume, thus being suitable for using in home and during travelling.

Although the embodiments of the present invention are described above with respect to the accompanying drawings, the present invention should not be limited to above mentioned specific implementations. The above mentioned specific implementations are for illustration instead of for limitation. Many forms can be carried out by those ordinary skills in the art with the teaching of the present invention without departing from the subject matter of the present invention and the scope of the claims. All these forms are within the scope of the present invention.

The invention claimed is:

1. A foldable bath tub comprising:
   a bottom board made of a first plastic material and formed by a first one-shot injection molding process;
   a panel made of a second plastic material and formed by a second one-shot injection molding process; and
   a foldable circular basin wall made of a thermoplastic elastomer and formed by a two-shot injection molding process, wherein the foldable circular basin wall is disposed between the bottom board and the panel such that the bottom board are connected with the panel by the foldable circular basin wall.

2. The foldable bath tub according to claim 1, wherein the foldable circular basin wall comprises a plurality of annular creases parallel to the bottom board, and the foldable circular basin wall is foldable toward the bottom board along the annular creases.

3. The foldable bath tub according to claim 1, wherein the bottom board comprises:
   a plane portion; and
   a lower connection wall extending upward from edges of the plane portion and connected with the foldable circular basin wall.

4. The foldable bath tub according to claim 3,
   wherein the lower connection wall comprises a bottom groove at an upper end of the lower connection wall;
   wherein the bottom groove extends along a periphery of the upper end of the lower connection wall; and
   wherein the bottom groove is filled with the thermoplastic elastomer during the two-shot injection molding process to connect the bottom board and the foldable circular basin wall.

5. The foldable bath tub according to claim 4,
wherein the bottom groove comprises a plurality of first through holes; and
wherein the first through holes are filled with the thermoplastic elastomer during the two-shot injection molding process.

6. The foldable bath tub according to claim 1, further comprising:
a water outlet disposed at the bottom board; and
a rubber stopper configured to fit with the water outlet.

7. The foldable bath tub according to claim 1, wherein the panel comprises:
an annular edge elements; and
an upper connection wall extending downward from the annular edge element and connected with the foldable circular basin wall.

8. The foldable bath tub according to claim 7,
wherein the upper connection wall comprises a top groove at a lower end of the upper connection wall;
wherein the top groove extends along a periphery of the lower end of the upper connection wall; and
wherein the top groove is filled with the thermoplastic elastomer during the two-shot injection molding process to connect the panel and the foldable circular basin wall.

9. The foldable bath tub according to claim 8,
wherein the top groove comprises a plurality of second through holes; and
wherein the second through holes are filled with the thermoplastic elastomer during the two-shot injection molding process.

10. The foldable bath tub according to claim 7, wherein the annular edge element comprises a hook, and an inner side of the hook is covered with the thermoplastic elastomer during the two-shot injection molding process.

11. The foldable bath tub according to claim 7, wherein the annular edge element comprises two handgrips opposite to each other, and each of the handgrips comprises:
raised reinforcing ribs; and
a groove coated with the thermoplastic elastomer.

12. The foldable bath tub according to claim 7,
wherein an upper surface of the annual edge element comprises a concave pattern having a plurality of third through holes; and
wherein the thermoplastic elastomer passes through the third through holes and then fills in the concave pattern during the two-shot injection molding process.

13. The foldable bath tub according to claim 7, wherein the annular edge element comprises an item storage.

14. The foldable bath tub according to claim 2, further comprising a plurality of detachable supporting bars configured to be arranged between the panel and the bottom board,
wherein the detachable supporting bars are located at an outer side of the foldable circular basin wall;
wherein when the foldable bath tub is unfolded, the detachable supporting bars support both the panel and the bottom board; and
wherein when the foldable bath tub is folded, the detachable supporting bars are located below the panel.

15. The foldable bath tub according to claim 14,
wherein the foldable bath tub comprises four detachable supporting bars, each having a round first end and a round second end;
wherein a lower surface of the panel comprises four upper fixtures, each of the upper fixtures comprises an upper hollow cylinder for accommodating the first end of a corresponding supporting bar, and each of the upper hollow cylinder has a gap for rotation of the corresponding supporting bar;
wherein the bottom board comprises four lower fixtures corresponding to the four upper fixtures, each of the lower fixture comprises a lower hollow cylinder for accommodating the second end of the corresponding supporting bar, the lower hollow cylinder has a locking portion at an end thereof, and the locking portion is unlockable by an external force; and
wherein the first end of each supporting bar is inserted into the corresponding upper hollow cylinder, and the second end of each supporting bar is inserted into the corresponding lower hollow cylinder when the foldable bath tub is unfolded and is pulled out of the lower hollow cylinder when the foldable bath tub is folded.

16. The foldable bath tub according to claim 6, wherein the rubber stopper comprises a temperature indicator layer configured to change color according to temperature.

17. The foldable bath tub according to claim 1, further comprising two foldable supporting frames on a lower surface of the panel opposite to each other,
wherein when the foldable bath tub is unfolded, the foldable supporting frames are unfolded to support the panel; and
wherein when the foldable bath tub is folded, the foldable supporting frames are folded to lean against the lower surface of the panel.

18. The foldable bath tub according to claim 17, wherein each of the foldable supporting frames comprises:
two supporting legs;
a lateral part connecting the two supporting legs; and
two connectors each in rotary connection with an upper end of a corresponding supporting leg and in permanent connection with the lower surface of the panel.

19. The foldable bath tub according to claim 18,
wherein the upper end of each supporting leg comprises an elastic fastener and the corresponding connector comprises a fastening position corresponding to the elastic fastener; and
wherein when the foldable supporting frame is unfolded, the elastic fastener buckles into the fastening position.

20. The foldable bath tub according to claim 18,
wherein the connector has a U-shaped periphery; and
wherein when the foldable supporting frame is unfolded, the supporting legs are located against a bottom of the U-shaped periphery.

* * * * *